(12) United States Patent
Wood

(10) Patent No.: US 12,031,667 B2
(45) Date of Patent: Jul. 9, 2024

(54) COLLAPSIBLE STAND

(71) Applicant: RTL MATERIALS LTD, Lymington (GB)

(72) Inventor: Richard Wood, Lymington (GB)

(73) Assignee: RTL MATERIALS LTD, Lymington (GB)

(*) Notice: Subject to any disclaimer, the term of this patent is extended or adjusted under 35 U.S.C. 154(b) by 0 days.

(21) Appl. No.: 17/772,113

(22) PCT Filed: Oct. 22, 2020

(86) PCT No.: PCT/EP2020/079819
§ 371 (c)(1),
(2) Date: Apr. 26, 2022

(87) PCT Pub. No.: WO2021/099058
PCT Pub. Date: May 27, 2021

(65) Prior Publication Data
US 2022/0397234 A1    Dec. 15, 2022

(30) Foreign Application Priority Data
Nov. 22, 2019 (GB) .................................... 1917050

(51) Int. Cl.
*F16M 11/40* (2006.01)
*F16M 11/16* (2006.01)

(52) U.S. Cl.
CPC ............ *F16M 11/40* (2013.01); *F16M 11/16* (2013.01)

(58) Field of Classification Search
CPC ...... F16M 11/40; F16M 11/16; F16M 11/242; F16M 11/247; F16M 2200/08; G03B 17/561
(Continued)

(56) References Cited

U.S. PATENT DOCUMENTS 1,780,039 A * 10/1930 Pechan ................ F16M 11/242
                                                    248/188
1,959,886 A *  5/1934 Wadsworth ........... B05B 15/622
                                                    248/168
(Continued)

FOREIGN PATENT DOCUMENTS

CN          109654346 A      4/2019
DE             575661 C      5/1933
(Continued)

OTHER PUBLICATIONS

PCT/EP2020/079819 International Search Report and Written Opinion Mailed Dec. 21, 2020.
(Continued)

*Primary Examiner* — Christopher Garft
(74) *Attorney, Agent, or Firm* — Troutman Pepper Hamilton Sanders LLP

(57) ABSTRACT

The present invention relates to a collapsible stand, a kit for a collapsible stand and to associated methods and apparatus. The collapsible stand is intended for supporting an object, and includes a head unit comprising a fixture for attaching to the object, and one or more leg sockets; and one or more legs proximal ends of which are reversibly received in the respective leg sockets. Each leg comprises a bistable reelable composite member having a first stable form in the form of an elongate slit tube in which form the member is resiliently biased and acts as a leg. When removed from the socket, the tube can be opened out at the slit at an end and progressively coiled to reversibly attain a second stable form in the form of a coil. The coil defines an internal space for accommodating at least part of the head unit.

18 Claims, 7 Drawing Sheets

(58) Field of Classification Search
USPC .............. 248/188, 163.1–171; 403/345–383, 403/322.4, 374.5, 330, 321
See application file for complete search history.

(56) References Cited

U.S. PATENT DOCUMENTS

| | | | | | |
|---|---|---|---|---|---|
| 1,965,644 | A | * | 7/1934 | Heffelfinger | A61G 1/003 403/205 |
| 2,133,890 | A | * | 10/1938 | Brown | F04B 47/00 403/321 |
| 2,204,013 | A | * | 6/1940 | Gaidos | F16M 11/12 248/168 |
| 3,327,979 | A | * | 6/1967 | Hayama | F16M 11/40 248/166 |
| 4,132,489 | A | * | 1/1979 | Berg, Jr. | F16B 7/0426 15/144.3 |
| 4,577,837 | A | * | 3/1986 | Berg | A47L 9/244 248/408 |
| 4,586,399 | A | * | 5/1986 | Kassai | B62B 9/20 403/108 |
| 4,646,371 | A | * | 3/1987 | Nowell | A47C 19/005 403/361 |
| 4,934,658 | A | * | 6/1990 | Berg | F16B 7/105 248/408 |
| 6,217,975 | B1 | | 4/2001 | Daton-Lovett | |
| 10,124,545 | B2 | | 11/2018 | Daton-Lovett | |
| 2010/0230560 | A1 | * | 9/2010 | Nakatani | F16M 11/14 248/168 |
| 2016/0226126 | A1 | * | 8/2016 | Daton-Lovett | H01Q 1/36 |
| 2016/0363257 | A1 | * | 12/2016 | Kendall | F16M 11/18 |
| 2018/0128419 | A1 | * | 5/2018 | Brown | F16M 11/40 |
| 2019/0323653 | A1 | | 10/2019 | Pollack | |
| 2021/0277655 | A1 | | 9/2021 | Daton-Lovett | |

FOREIGN PATENT DOCUMENTS

| | | |
|---|---|---|
| GB | 2182240 A | 5/1987 |
| WO | 9608671 A1 | 3/1996 |
| WO | 2018172728 A1 | 9/2018 |

OTHER PUBLICATIONS

TiborasaurusRex. (Apr. 24, 2015). What sniper tripod do commandos use?—R.P.A. Rolatube Tripod—Rex Reviews (1080p HD). YouTube. Retrieved Jan. 10, 2023, from https://www.youtube.com/watch?v=s24_BuqdWtU.

* cited by examiner

COLLAPSIBLE STAND

CROSS-REFERENCE TO RELATED APPLICATIONS

The present application is a national phase filing under 35 U.S.C. § 371 of International Patent Application No. PCT/EP2020/079819, which claims the priority benefit from GB 1917050.5 filed 22 Nov. 2019, the entire contents of each are herewith incorporated by reference.

TECHNICAL FIELD

The present invention relates to a collapsible stand, a kit for a collapsible stand and to associated methods and apparatus.

BACKGROUND

As is well known, stands may be provided for supporting the weight and/or positioning and maintaining the stability of some other object. These are typically in the form of frame or support, with some number of legs, used as a platform. Examples include monopods, tripods, etc. Typical uses are supporting cameras, surveying equipment, lights, screens, armaments, etc. A monopod supports the weight of the equipment attached to the stand, whilst multi-legged stands such as a tripod provides stability against downward forces as well as horizontal forces and movements about horizontal axes. The positioning of the three legs away from the vertical centre allows the tripod better leverage for resisting lateral forces.

Often it is desired to use such a stand in the field, in which case portability becomes important. Size, weight and storability are important factors. A known class of stands have metal or composite telescopic leg or legs, which can be retracted for portability, or sometimes also to adjust the height. The legs of a multi-leg device sometimes may also pivot inwards to reduce the footprint of the device. Thus, the stand can collapse in size to help portability and storability. Nonetheless such stands are often heavier and bulkier than desired. Robustness and protection against damage are also important considerations, as is minimising the number of moving parts Carrying cases and the like are sometimes employed to stow the stand. The stand should preferably also be simple and quick to stow/unstow. Preferably tools, such as drivers for fasteners, are not needed, as they have the tendency to get lost, etc.

The present invention aims to address all or some of these issues and generally provide an improved stand.

SUMMARY

According to a first aspect of the present invention, there is provided a collapsible stand for supporting an object, comprising:
  a head unit comprising a fixture for attaching to the object, and one or more leg socket; and
  one or more legs proximal ends of which are reversibly received in the respective leg sockets,
  wherein each leg comprises a bistable reelable composite member having a first stable form in the form of an elongate slit tube in which form the member is resiliently biased and acts as a leg, and wherein when removed from the socket, the tube can be opened out at the slit at an end and progressively coiled to reversibly attain a second stable form in the form of a coil, the coil defining an internal space for accommodating at least part of the head unit.

This allows the stand to collapse to a much smaller volume for stowing the stand, e.g. in a bag or case, for ease of portability and storage. The legs can be made from fibre reinforced polymer composites, which can be made stiff, light and robust. The head unit can be made mainly from moulded plastics material and/or metallic alloys, again to provide a lightweight robust stand. This provides a much simpler and lighter mechanism for collapsing the stand that prior art approaches, such as those with telescopic aluminium legs, and which can attain smaller volumes when packed away. The system has a small number of moving parts and is therefore less liable to damage during use.

Any convenient number of legs may be used according to the desired application, e.g. one leg for a monopod, to provide vertical support or "selfie stick", two legs to provide vertical and lateral support, three legs to form a tripod to provide support in vertical and both lateral directions, or four legs, or more. Where plural legs are used, the legs may be co-coiled, further reducing the volume when packed. Furthermore, the rolled coils naturally define an inner volume, which can be occupied by other parts of the stand, further reducing the packing volume.

The stand can be used with any desired object or load, such as cameras, sensors, armaments, etc. A fitting at the top of the head unit may be provided to attach to the desired load.

The leg may in principle be provided in any diameter or length, according to the application and the forces that the stand is required to resist. In most applications, it is anticipated that the tubes will have a diameter of between 2.5 and 10 cm, with between 3 and 6 cm being particularly preferred for typical applications. In most applications, the members will have a length of between 30 cm and 1.5 meters, e.g. for providing a convenient range of heights for the object for use by a human operator in various standing, sitting, prone positions, etc.

In an embodiment the one or more legs are arranged to form a coil with a diameter approximately equal to an outer diameter of the head unit, such that in a stowed configuration the legs are coiled around the head unit to achieve a compact size. The head unit may provide a suitable "substrate" on which the coiling may be commenced. The legs can be co-coiled, or one after the other. Preferably, the coil forms a snug fit on the outer diameter, i.e. using the resiliency of the member to slightly compress the head unit, which is advantageous in keeping the parts together, and minimising any vibration and/or rattling that may occur in transit.

The legs may have a coiling diameter that is at least twice that of their diameter in extended tubular form to aid forming the coil around the head unit. This has advantages in terms of the packing format, but also in terms of the cycle life of the product. In particular, a larger rolled diameter generally equates to less stress in the member and therefore is able to tolerate more cycles of coiling/uncoiling yielding a longer life span. This is particularly useful where the stand has plural legs, in which case the leg sockets are likely to define the outer diameter of the stand. As discussed below, in a preferred embodiment in which the stand is a tripod, the leg socket may pivot inwards to a vertical or near vertical position, defining the outer diameter at three points, about which the legs can be coiled. Each leg housing may conveniently be in the form of a cylinder defining the socket, in which case the packing diameter of the cylinders will be approx. 2.16 times the outer diameter of the leg housings.

(similarly for two sockets, the packing diameter will be 2 times the outer diameter of the leg housings, for four sockets, the packing diameter will be approx. 2.41 times the diameter, etc.). Thus, allowing a few mm for the wall thickness of the leg housings, it can be seen that in many examples, the outer diameter of the stand defined by the leg housings will be between 2 and 3 times the diameter of the legs. The members may be engineered to provide such a diameter by aligning the fibres in the fibre reinforced composite and/or increasing the bending stiffness of the member in the longitudinal direction relative to the transverse direction to achieve a desired, relatively large, coiled diameter. For instance, the angled fibres are angled (or have an average angle if not straight) at between 20 and 40 degrees to the longitudinal axis to increase the Poisson's ratio of these layers in the longitudinal direction (which may also have the effect of increasing longitudinal bending stiffness) so these layers achieve a large coil diameter, in contrast with typical members where the angles used are typically about 45 degrees. Thus, an example layup may be +−30, 90, 0, +−30.

In an embodiment the head unit comprises a body and one or more leg housings in which the respective one or more leg sockets are formed, wherein each leg housing is pivotally attached to the body to allow the angle of the leg to be adjusted, wherein the head unit further comprises a fixing mechanism to clamp each leg housing at a desired angle. This allows easy adjustability of the working height and/or angle of the stand, for instance to allow the operator of the equipment to operate from different positions, e.g. prone, sitting, standing, etc., as well as dealing with uneven ground.

In an embodiment, a hinge joint is provided to pivotally attach each leg housing to the body, and the fixing mechanism comprises a lever with a camming action attached to a skewer pinning the hinge joint which is reversibly movable to compress the hinge joint and so clamp the leg housing in position. This allows a better fixing than relying on friction, and more adjustability than relying on tethering the legs together to fix their maximum permitted travel. A visual scale may be marked on the body and leg housing so that the operator can easily set each leg to the same angle of deployment during deployment.

In an embodiment, each leg has a through hole at its proximal end, and the leg housing has a movable latch comprising a protruding element adapted to engage with the corresponding through hole to mechanically retain the leg in place in the leg socket. Thus, latch can be moved to engage and disengage with the leg when it is desired to insert/remove the leg from the socket. The design of the latch is such that it automatically engages as the tube is pushed into the socket, preferably with an audible "click", and the latch needs to be manually depressed to remove the leg. This can be used together with or instead of frictional forces to keep the leg in place in the socket.

In an embodiment, the stand comprises one or more foot units for attaching to the distal ends of the respective legs, each foot unit having a foot socket for receiving the end of the respective leg, wherein each leg has a through hole at the end inserted into the foot socket and the foot unit has a movable latch comprising a protruding element adapted to engage with the corresponding hole to retain the leg in place in the foot socket. Thus the foot unit reversibly connects to an end of the bistable tubular leg in a similar manner to the leg socket, as described above.

The latch in the foot unit may be similar to the latch in the leg housing. Preferably the legs have similar through holes in both ends, such that either end of the leg can be inserted into the leg socket, and either end of the leg can be inserted into the foot unit. By placing the hole toward the end of the member, there is little impact on the structural integrity of the member. When the extended member is viewed in cross section, the hole is preferable positioned towards the centre portion of the member, rather than at the edges, where the stresses experienced by coiling/uncoiling the member are largest, to minimise the impact on the structural integrity of the member. This central position also allows the interchangeability of each end of the leg into either the foot or the leg socket. For instance, where the rotational orientation of the leg is keyed to the socket when entering the socket, the central position gives mirror symmetry and allows either end of the leg to be inserted into either socket. The hole can be reinforced if desired. If desired, each socket may have plural latches engaging with plural holes in the member, e.g. longitudinally spaced or circumferentially spaced.

In an embodiment, the protruding element is user operable to move between an engaging position in which it engages with the through hole of the leg and a releasing position in which it disengages to allow the leg to be removed. For instance, a surface portion of the latch may be slidable or depressible by the user's thumb or finger to move the protruding element. Preferably this is arranged such that the user can hold the leg housing in one hand and operate the latch, whist the other hand holds the leg and inserts it into or pulls it out of the socket.

In an embodiment, the protruding element is resiliently biased in the engaging position by a biasing element. Thus, there is less chance of the protruding element accidentally moving to the non-engaging position.

In an embodiment, the protruding element has a ramped camming surface facing the socket opening, such that the leading edge of the leg entering the socket bears on the ramped camming surface and moves the protruding element out of the way whilst the leg is fully inserted into the socket. Preferably the protruding element returns with an audible click when engaging. Thus, the user can simply push the leg into the socket, without having to operate the latch manually. The opposed surface of the protruding element is not ramped, so it butts up against the hole and prevents the leg being withdrawn.

In an embodiment, the foot unit comprises a tubular member extending from the foot socket forming an annular space with the inner surface of the socket for receiving the end of the leg, the tubular member comprising a through hole, such that, with the legs removed, the foot unit can be reversibly connected to the head unit by inserting the tubular member into a leg socket and the through hole of the tubular member engages with the protruding element of the latch of that leg socket to retain the foot unit in place. Thus, each foot unit may be securely and reversibly fastened to the head unit for when the stand is collapsed for being stowed. Thus, the latch in the leg housing has a double function in retaining either the leg or the foot unit depending on whether the stand is deployed or collapsed. In other embodiments, it will be appreciated that the arrangement is reversed, i.e. the leg housing socket has a protruding tubular member with a hole, and the latch in the foot unit is arranged to have a double function in retaining either the leg of the protruding tubular member of the head unit.

In an embodiment, the stand is in a collapsed configuration, wherein the one or more legs form a coil around the head unit and the attached feet.

In an embodiment, stand comprises plural sets of legs and a removable central pillar downwardly extending from the head unit and arranged to contact the ground to provide vertical support to the stand when the legs are set at an obtuse angle when the stand is to be used in a lowermost position. In an embodiment, when the central pillar is removed, a hook or other attachment point is exposed which can be used for attaching a weight or tie down to the stand head unit in order to stabilise it during use.

According to a second aspect of the present invention, there is provided a method of erecting a stand as described above, comprising uncoiling the one or more legs from around the head unit to assume their extended form, and fitting the extended legs to the leg sockets and optionally fitting respective foot units to the leg units.

In an embodiment, the method comprises setting the legs to a desired angle and clamping them into position.

According to a third aspect of the present invention, there is provided a method of collapsing a stand as described above, the method comprises detaching the one or more legs from the head unit and if present detaching the respective foot units from the legs and coiling the legs around the head unit.

In an embodiment, the method comprises adjusting the angular position of the legs to a vertical position before coiling the legs around the head unit.

In an embodiment, the method comprises attaching the one or more foot units to the head unit before coiling the one or more legs around the assembly of head unit and foot units.

According to a fourth aspect of the present invention, there is provided a kit for a stand for supporting an object, comprising: a head unit comprising a fixture for attaching to the object and one or more leg sockets;
respective legs coiled around the head unit,
wherein each leg comprises a bistable reelable composite member having a first stable form in the form of said coil and wherein when progressively uncoiled from the head unit, the tube assumes a second stable form as an elongate slit tube in which form the member is resiliently biased and in which form proximal ends of the one or more legs are reversibly receivable in the one or more leg sockets so as to act as legs.

According to a fifth aspect of the present invention, there is provided A body having a leg housing defining a leg socket for retaining a leg in the form of a slit tubular extendible member, wherein each leg member has a through hole at the end inserted into the leg socket, and the leg housing has a movable latch comprising a protruding element adapted to engage with the corresponding hole to retain the leg member in place in the leg socket such that the leg member can support, move and/or guide the body.

This arrangement is capable of providing secure attachment to any number of tubular members, e.g. one, two, three, four or more legs, as meets the desired application. Any number of bodies may thereby be quickly, securely and conveniently be reversibly attached securely to a stand, post, boom, mast, handle, etc.

In another aspect, there is provided a bistable reelable member whose coiled diameter is between 2 and 4 times the extended tubular diameter. The members may be engineered to provide such a diameter by aligning the fibres in the fibre reinforced composite and/or increasing the bending stiffness of the member in the longitudinal direction relative to the transverse direction to achieve the desired, relatively large, coiled diameter. This technique can be used in any application where it is desired that the coiled member has a relatively large diameter and/or to decrease the stresses and strains experienced during coiling/uncoiling to increase the mean number of cycles before failure.

It will be appreciated that any features expressed herein as being provided "in one example" or "in an embodiment" or as being "preferable" may be provided in combination with any one or more other such features together with any one or more of the aspects of the present invention. In particular, the extendible member, joining techniques and join testing system described in relation to one aspect may generally be applicable to the others.

BRIEF DESCRIPTION OF THE DRAWINGS

Embodiments of the present invention will now be described by way of example with reference to the accompanying drawings, in which.

DETAILED DESCRIPTION

Figure 1:
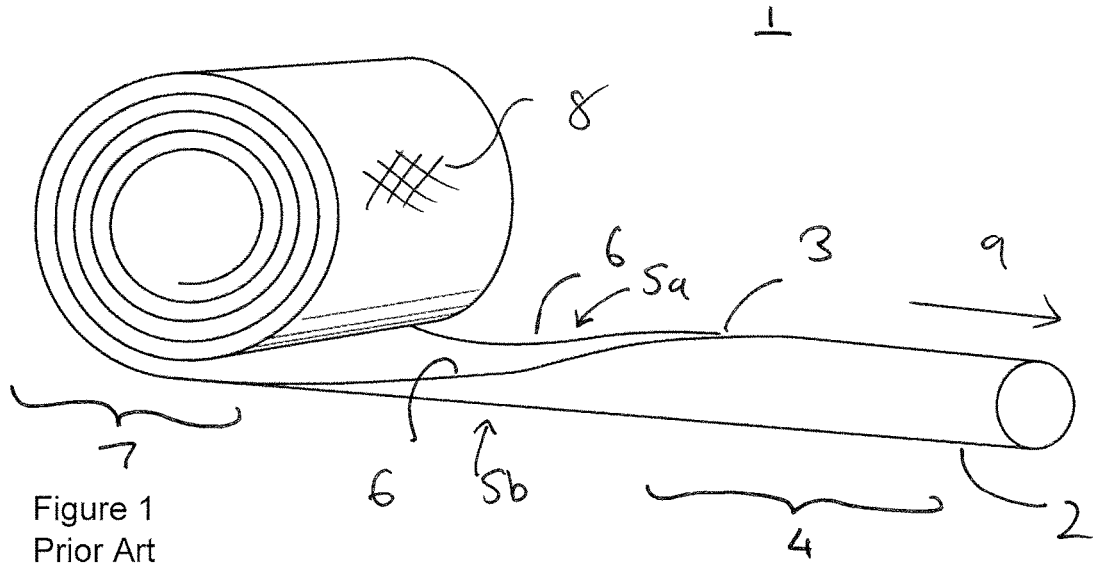
FIG. 1 shows an example of a bistable reelable composite.

FIG. 1 shows an example of an extendible member 1. The member 1 comprises a fibre-reinforced composite body 2 having a first form in the shape of an elongate slit tube in which shape it is resiliently biased. The slit tube can be opened out at the longitudinal slit 3 defined by the longitudinal edges 6 of the tube so as to be substantially flat so that it can be coiled about an axis transverse to the longitudinal axis of the tube.

The member 1 is bistable, having a first stable form in the slit tube extended form 4 (in which it has a first curvature), and a second stable form when coiled into a coiled form 7 (in which it has a second curvature). Examples of bistable coilable members are disclosed in the Applicant's U.S. Pat. No. 6,217,975 the entire contents of which are hereby incorporated by reference. The member may be constructed with edges as described in the Applicant's U.S. patent application Ser. No. 16/488,116 filed 22 Feb. 2018, the entire contents are hereby incorporated by reference, to increase performance of the members. Conventional methods can be used to make the composite or bistable member. Advantageous mechanised production methods of making a composite member are disclosed in the Applicant's U.S. Ser. No. 10/124,545B2 the entire contents are hereby incorporated by reference. Using a bistable member in this way means that the coiled sleeve is stable, meaning that it is easier to handle and store, etc.

In general, the member 1 is manufactured as a fibre-reinforced composite in which various plies of woven, braided or angled fibres 8 (shown in part in FIG. 1) are laid up in a mould or former and heat and/or pressure applied to melt the thermoplastic matrix material consolidate the layers into a composite product. To achieve bistability, at least two plies positioned in the layup towards the intrados 5*a* and/or extrados 5*b* faces of the tubular member (i.e. away from the neutral axis of bending of the member), are angled with respect to the longitudinal axis 9 of the product to as to create non-isotropic layers with a high Poisson's ratio. In known examples, a layup of plies with angles of +45, −45, 0, +45, −45 may be used. However, as discussed below, the composite construction may be adapted for specific use as legs for a stand.

Thus, opening out the first curvature of the tube 4 gives rise to tension in the fibres 8 near the intrados face 5a which due to their angle has a component in the longitudinal direction which tends to cause a contraction in this layer in the longitudinal direction. As the tube is opened out to a flatter form, its bending stiffness in a transverse decreases. Once the component of the tension arising in the fibres in the longitudinal is sufficient to overcome the bending stiffness it flips the member into having a secondary curvature in the longitudinal direction, i.e. acting to coil the member, and the tension in those fibres is relieved by that layer contracting. A similar effect is produced by the fibres at the extrados face compressing as the tube is opened out, giving rise to a force component in the longitudinal direction in that layer that tends to cause extension in this layer in the longitudinal direction, which again promotes coiling. Thus, due to the orientation of the fibres, as a portion of the slit tube is opened out, it "flips" into a stable coiled form which relieves partially or fully the strains in the fibres and is thus stable. The member is thus reversibly configurable between a stable coiled form and a stable tubular form by progressively flattening and coiling from one end to coil the member, and extending the member from the coil to assume the tubular form.

Figure 2:
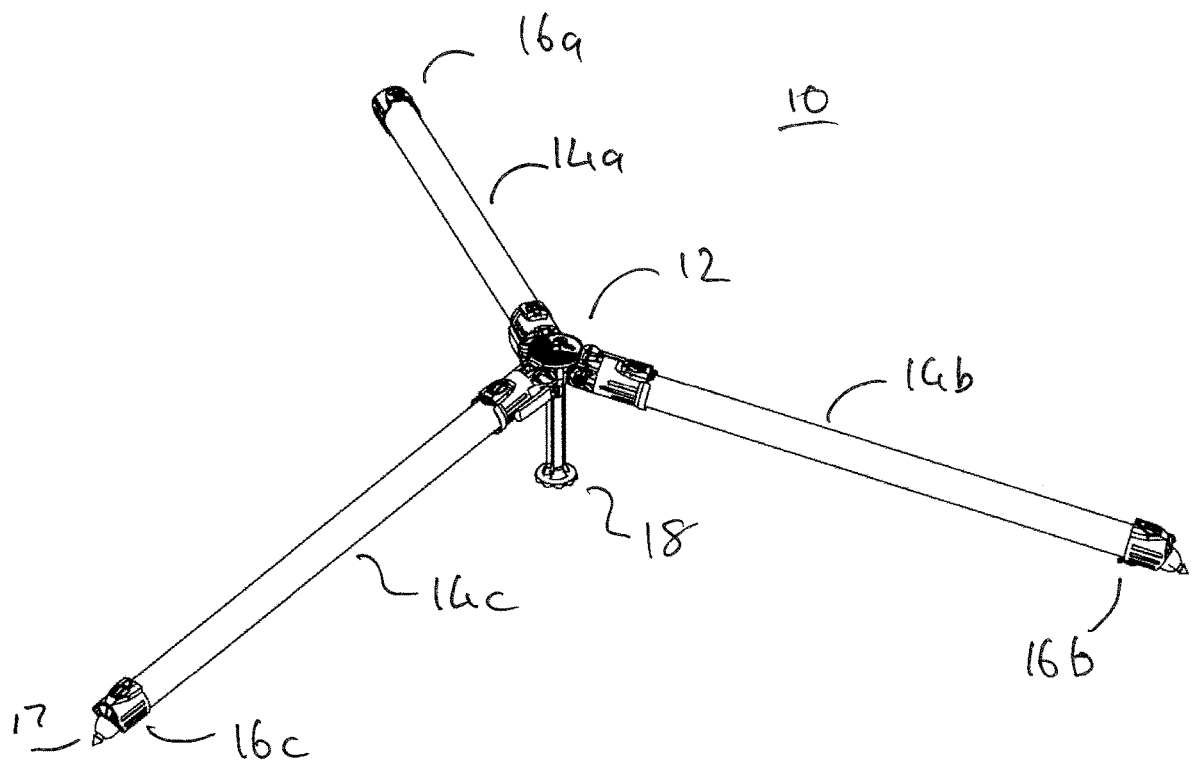
FIG. 2 shows a perspective view of an example of a stand in accordance with an embodiment of the present invention.
Figure 3:
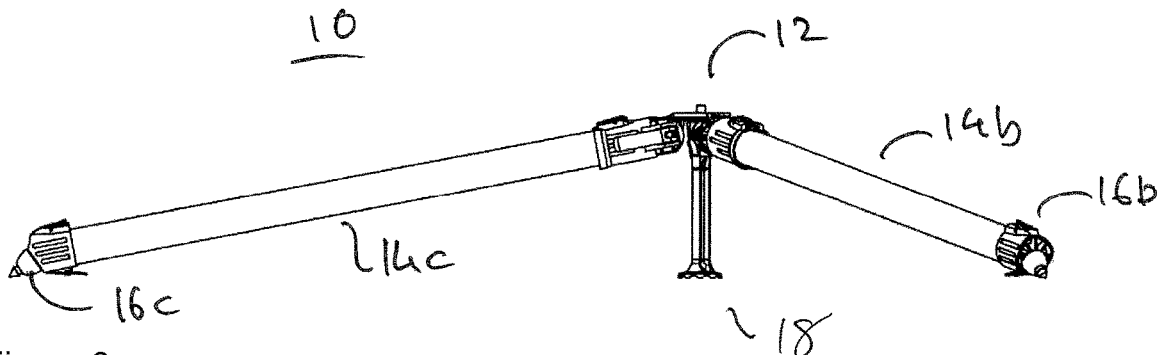
FIG. 3 shows the stand from the side and FIG. 4 shows the stand from above.
Figure 4:
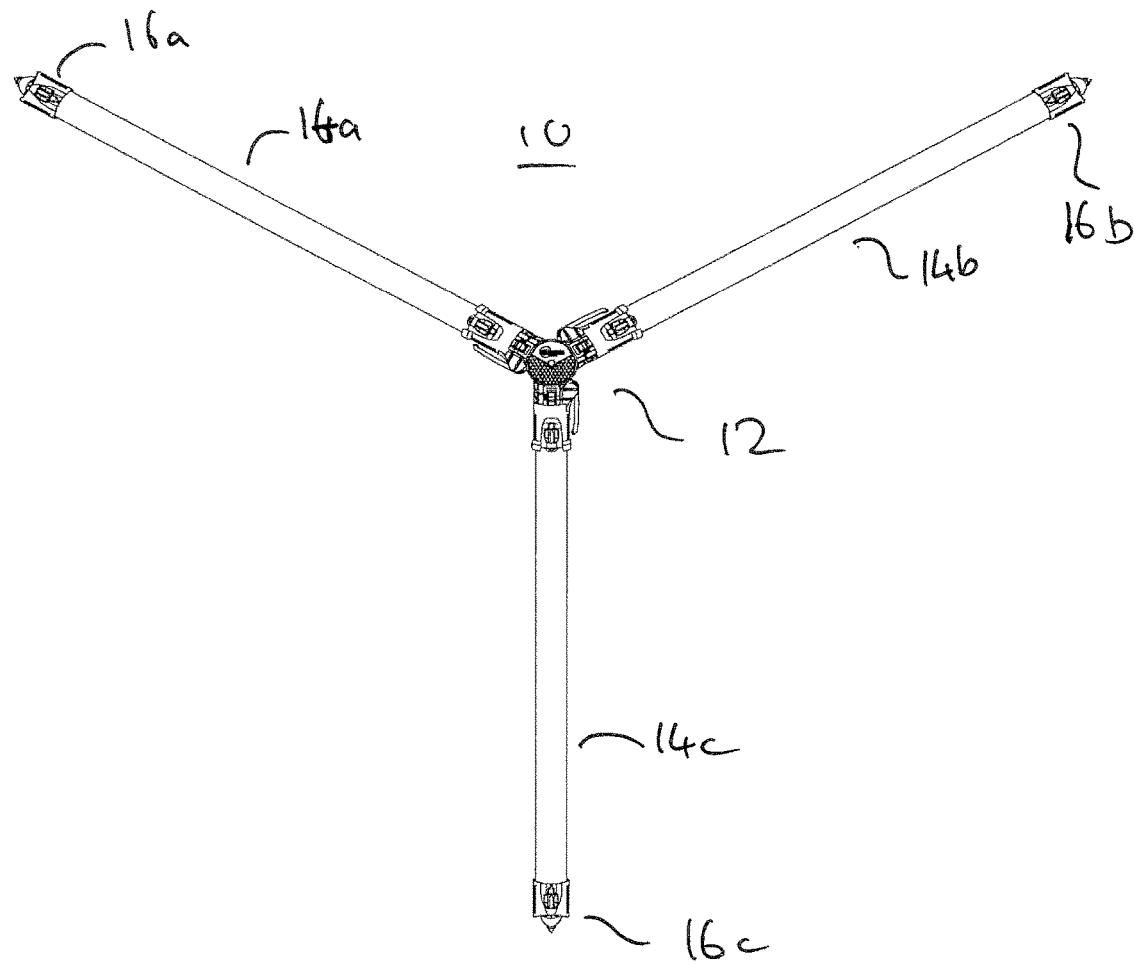

FIGS. 2 to 4 show various views of a stand, in this example being in the form of a tripod 10, comprising a head unit 12, three legs 14a,14b,14c (hereinafter referred to collectively as 14) extending from the head unit 12, and three feet units 16a,16b,16c (hereinafter referred to collectively as 16) at the ends of the three legs 16 for contacting the ground. An interchangeable spike or rubber foot or other such device 17 may be provided at the end of each foot unit 16 for providing traction on the ground or surface on which the tripod is erected. The head unit 12 comprises a removable downwardly extending central column 18 for providing additional vertical support when the tripod is used in a low position.

Each leg 16 comprises a bistable reelable composite member, such described above in relation to FIG. 1. As shown more clearly in FIGS. 5, 6, 10 and 11, the head unit 12 has three sockets 22a,22b,22c (hereinafter collectively 22) into which fit the proximal ends of the respective legs 14. Similarly, the feet units 16 each have a socket 60 which allow them to accept the distal ends of the legs 16.

Figure 5:
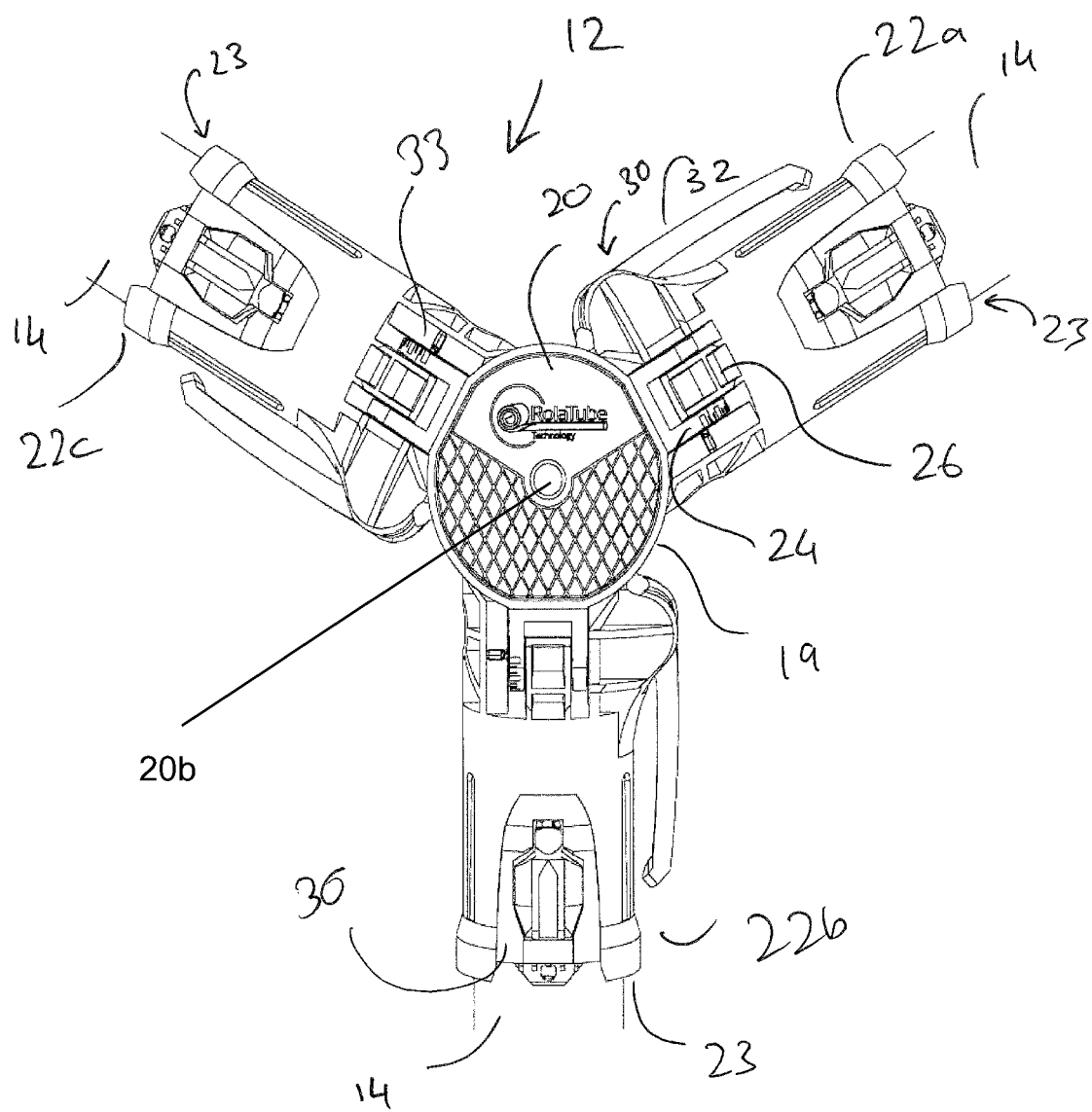
FIG. 5 shows a detail view of the central part of the stand.
Figure 6:
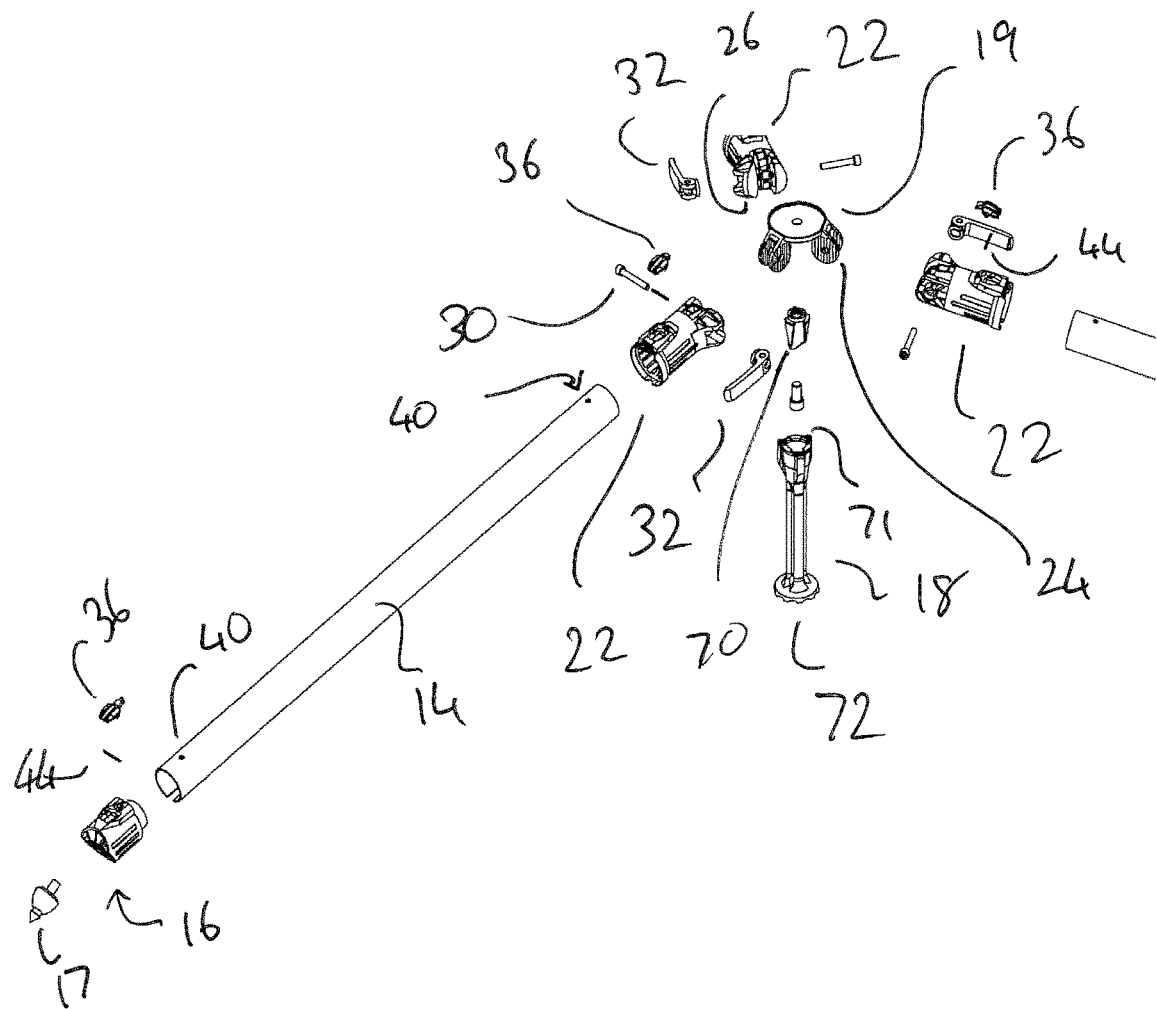
FIG. 6 shows an exploded view of the parts of the stand.

FIG. 5 shows the head unit 12 of FIG. 2 in more detail. The head unit 12 comprises a central body 19 having a top mount 20 which is adapted to receive the object to be supported by the tripod. For example, a fixture 20b, such as a screw fitting or slide fitting, may be provided for mounting a camera, etc. As shown by the exploded diagram of FIG. 6, the body 19 has a pivoted connection with three leg housings 22a, 22b, 22c, which provide the sockets 23 for the legs 14, spaced circumferentially around the body 19. Thus, for each leg, the body 19 has one or more extending hinge knuckles 24 which are pinned to one or more hinge knuckles 26 extending from the leg housings 22, thereby forming a hinge joint 22, 24. Thus, the legs 14 can pivot relative to the central unit 12 through a range of angles in circumferentially spaced vertical planes, e.g., between approximately vertical and approximately horizontal, or between at least 30 degrees to 60 degrees, allowing the operating height of the tripod to be adjusted.

The head unit 19 has a male bayonet fitting 70 downwardly extending for reversible connection to the top 71 of the central column 18. The central column 18 has a foot 72 at the bottom with surface features for providing traction on the ground. Where the tripod is used at a low position, e.g. the operator of the apparatus mounted to the tripod 10 is in a prone position, the legs 14 are at an obtuse where they are less able to provide vertical support (e.g. as shown in FIG. 3). Thus, the central column 18 is provided to contact the ground in this scenario and take the bulk of the weight of the assembly, with the legs mainly providing lateral stability in this scenario. However, it will be appreciated that the legs can be set at more acute angles to raise the height of the tripod at which point the central column will not be in contact with the ground and the legs themselves will bear the weight of the assembly. The bayonet fitting 70,71 allows the central column 72 to be removed, if desired, by twisting to the removal position. By removing the central column 18, a hook or other attachment point is exposed at the underside of the head unit 12 (for instance, integrated in the male bayonet fitting) to which a weight or tie down is attached, if desired, to stabilise the tripod in use.

The knuckles 24,26 may be pinned together by a skewer 30 passing through the knuckles, one end of which stops against the outermost knuckle on one side of the hinge joint and the other end of which attaches to a lever 32 adjacent the outermost knuckle on the other side of the hinge joint. The lever 32 is arranged to provide a camming action such that rotating the lever to a clamping position, in which it is preferably in-line with the housing 22, compresses the knuckles against each other and so clamps the leg in a desired position. Reversing the rotation of the lever 32, releases the joint so the leg is free to pivot.

Preferably each leg 14 has a clamping mechanism of this type so that each leg can be independently clamped in a desired position.

Each joint may have markings 33 providing a visual indication of the degree of rotation to aid the user setting the legs to the same angle, e.g. a pointer marking on one side of the knuckle progressively pointing along a scale marked on the other side of the knuckle as the joint is rotated. Alternatively or additionally, indexing may be provided between the parts so the parts "click" into a series of discrete positions as the joint is rotated.

The member 1 forming the leg is generally curved in cross section (for example circular) and preferably subtends an angle of close to 360 degrees, i.e. nearly forms a complete tube, to provide strength and stiffness to the leg and to aid fitting into a socket. The sockets may have a slightly smaller inner diameter than the natural diameter of the tube such that a user must slightly compress the ends of the tube to fit the member into the socket. The resilient bias of the extended member means that friction helps retain the member in the socket. A small slit may be left for this purpose, such that the angle subtended is between 325 and 355 degrees. However, other angles are possible, including where there is an overlap of the edges, and it is anticipated that angles of anywhere between 180 degrees to 390 degrees may be used for the members.

Additionally or alternatively, each leg housing 22 has a latch member 36 to help retain the leg 14 in position in the socket 23. As shown more clearly in the cross sectional view of the socket 23 in FIG. 10, the leg 14 has a hole 40 near its end which lines up with a protrusion 42 on the latch 36 when the leg 14 is introduced into the socket 23. The latch 36 is operable to move the protrusion into and/or out of engagement with the hole. In the present example, the latch 36 is arranged to reversibly pivot about a pin 44 from a non-engaging position, where the protrusion is withdrawn from the hole to allow the leg to enter the socket, to an engaging position (shown in FIG. 10), where the protrusion 42 enters the hole 40 and then retains the leg 14 in position. Part 46 of the latch 36 is positioned so it can be depressed by the user to pivot the latch to the non-engaging position against the action of a spring element 48 biasing the latch 36 in the engaging position.

Preferably the protrusion 42 is shaped with a ramped camming surface 43a facing the socket 23 entrance arranged such that the leading end 41 of the leg member 14 being introduced into the socket bears on the ramped surface and automatically moves the latch to the non-engaging position allowing the leg member 14 to be simply pushed into the socket without manually operating the latch 36. Once the member is fully introduced into the socket 23, such that the leading end 41 butts against stops 50 in the socket 23, the protrusion 42 may enter the hole 40. The protrusion 42 has a non-ramped surface 43b facing away from the socket 23 such that it latches against the hole 40 and prevents the leg from being withdrawn. It may be necessary for the user to rotate the leg 14 in the socket 23 (where the sockets and legs are circular in cross section) to rotationally align the protrusion with the hole before it engages. Alternatively, the inside of the socket may have guides (not shown) arranged to register with the edges of the slit tube member to rotationally align the member as it is inserted into the socket to align the holes with the protrusions. Alternatively, non-circular sockets and legs could be used which do not permit arbitrary rotational alignment.

Figure 11:
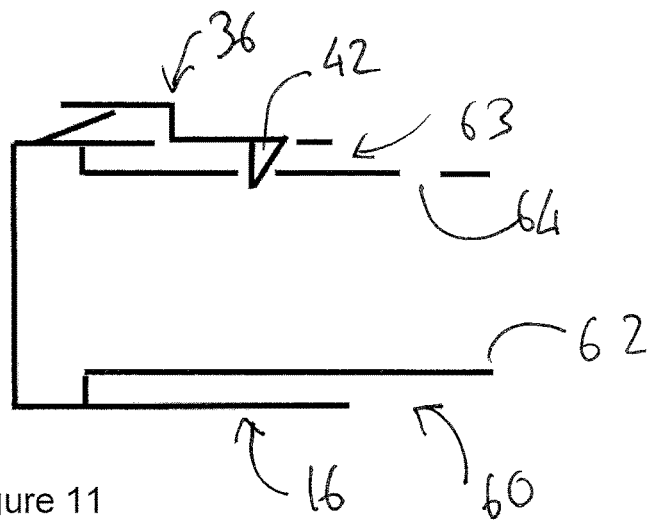
FIG. 11 shows in cross section a foot unit.

As shown by the cross section of FIG. 11, each foot unit 16 has a socket 60 to accept the distal end of the respective leg 14. The socket 60 may be provided with similar latches 36 for connecting to the legs as those latches 36 described above in relation to the leg housings 22, i.e. so that a protrusion on the latch 36 in the foot unit 16 engages a hole in the member near the respective end of the leg 14. Thus the socket 60 in the foot unit retains the leg in a similar way to the socket 22 in the leg housing. Unlike the socket 22 in the leg housing, the socket 60 in the foot unit additionally has a tubular part 62 extending from the socket, thus creating an annular space 63 between the external face of the tubular part 62 and the internal face of the socket 60, which receives the end of the leg 14.

Figure 12:
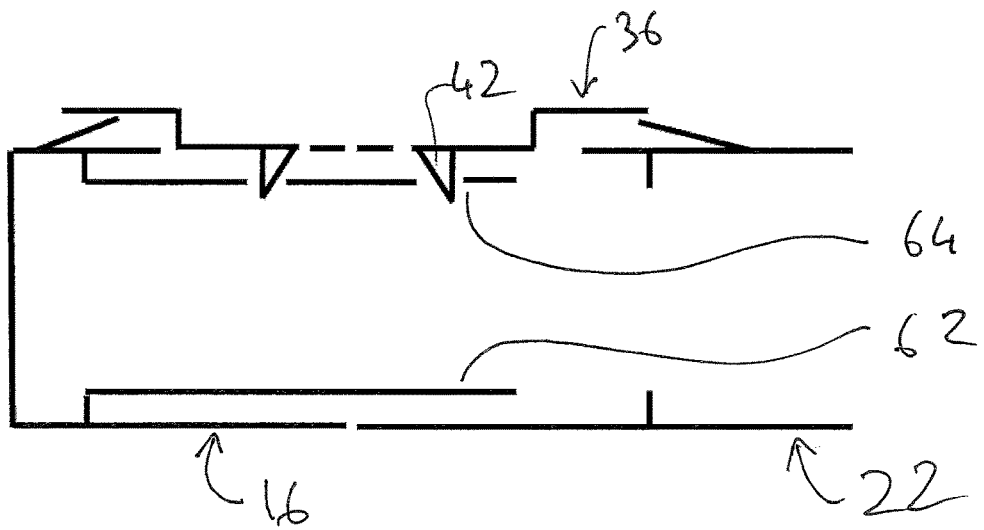
FIG. 12 show a foot unit latching to the head unit for stowing the stand.

The extending tubular part 62 can be used to attach the feet units 16 to the central unit 12 when the tripod is disassembled and stowed (as described further below). In particular, as shown in FIG. 12, the tubular part 62 has a hole 64 in it near its end. With the legs removed from the sockets, the tubular part 62 can be advanced into the socket 23 in the leg housing 22 until the protrusion 42 of the latch 36 in the leg housing 22 engages with the hole 64, thus latching the foot unit in place in the socket (in a similar way to how the legs are latched into the socket). The user depresses the latch 36 to release the foot unit 16 when desired.

Thus, the latch 36 advantageously serves a double purpose in retaining both the legs and feet according to whether the tripod is assembled or stowed. Nonetheless, in other embodiments, other arrangements may be used to attach the feet units to the central unit, such as a friction fit, screw connection or bayonetted fit, if desired.

Preferably the head unit 12 and feet units 16 are made from moulded plastics material to keep down weight, with metal fastenings and pins where needed.

Figure 7:
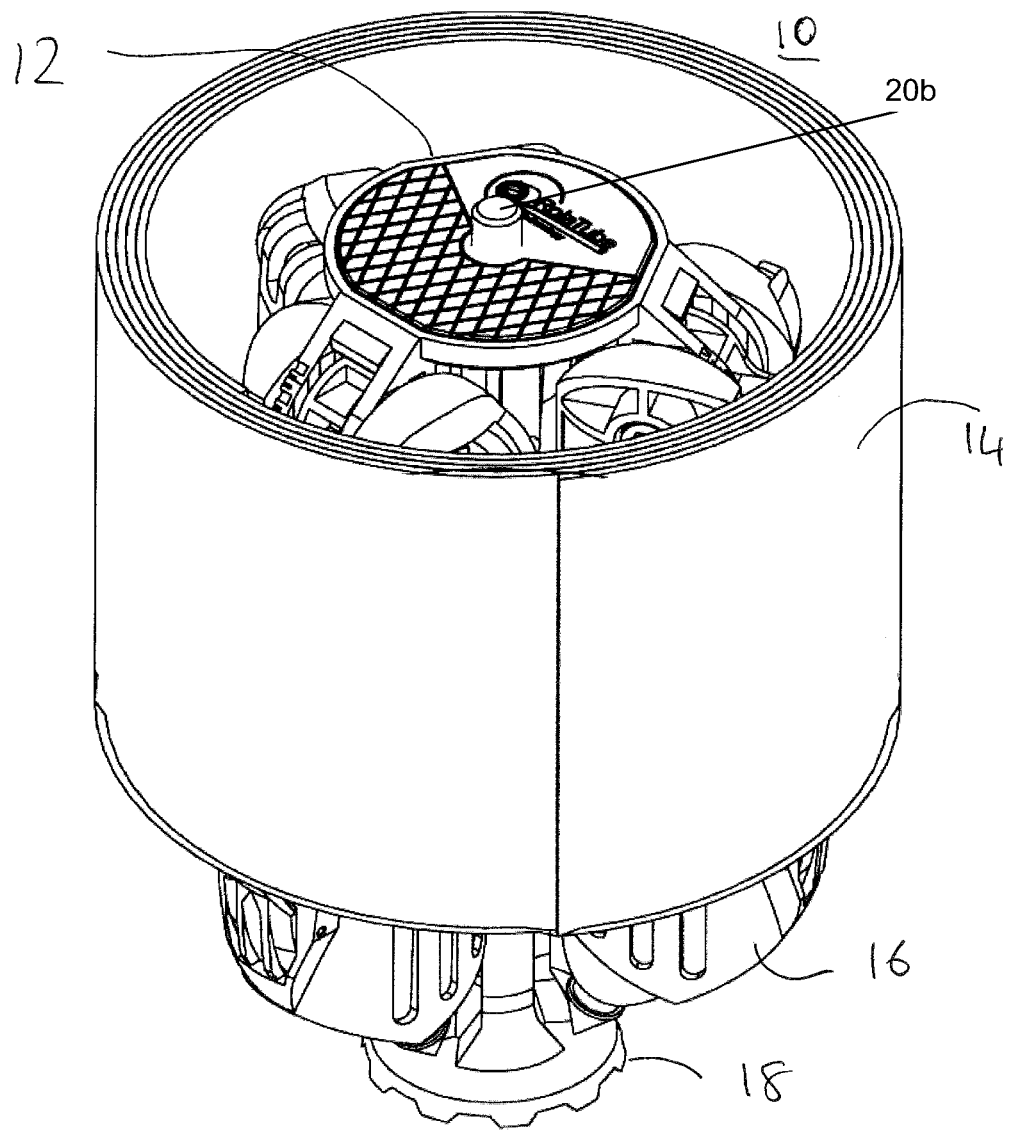
FIG. 7 shows a perspective view of the stand disassembled and configured for being stowed.
Figure 8:
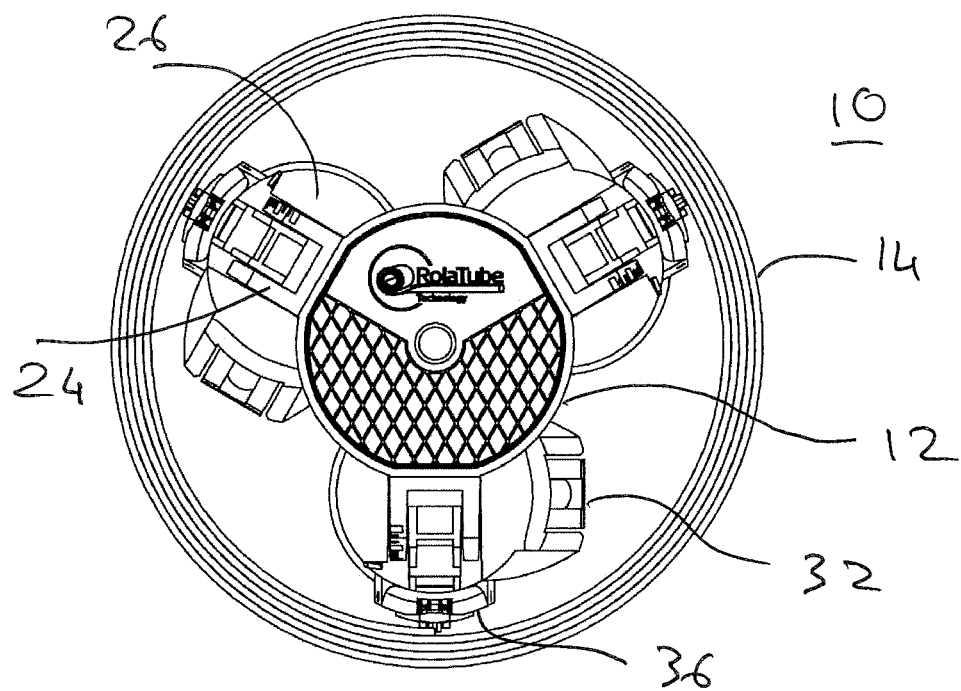
FIG. 8 shows the stowed stand from above and FIG. 9 shows the stowed stand from the side.
Figure 9:
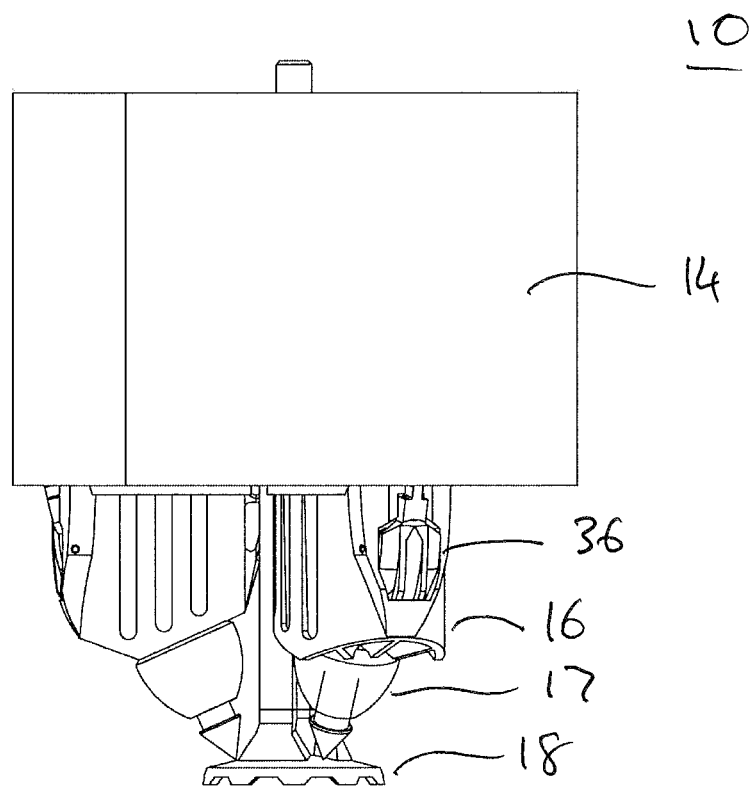
Figure 10:
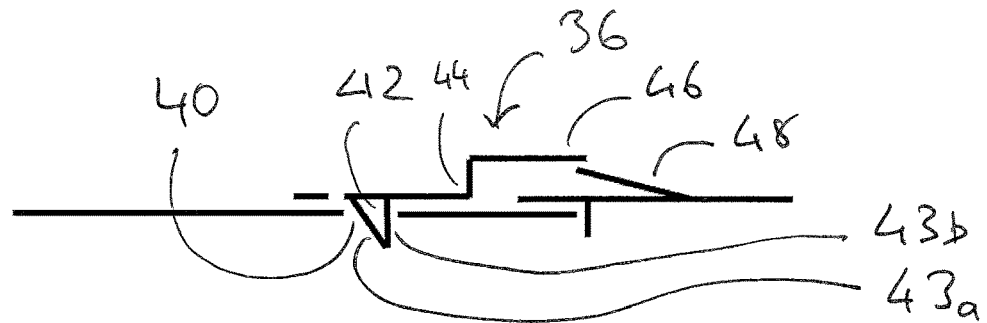
FIG. 10 shows in cross section a leg latching into a socket of the head unit.

Thus, a tripod 10 is provided that can be collapsed to a form suitable for being stowed. First the legs 14 are disengaged from the sockets 23,60 in the central unit 12 and the feet units 16, i.e. by depressing the latches and pulling the legs free. The extending tubular part 62 can then be used to attach the feet units to the sockets 23 in the head unit 12 via the latches 36. The levers 32 clamping the leg housing 22 in position are then released, and the leg housings and feet units pivoted downwards to a downwardly extending vertical position, forming a collapsed head unit and foot assembly, so as to minimise the diameter of the central unit. Each leg is then flattened at one end and coiled around the external periphery of the central unit. This can be done either together or one after the other. It will be appreciated that certain steps can be performed in a different order, e.g. the legs could be moved to the vertical position before the legs are removed from the sockets, or before the feet are attached to the sockets, etc. In this collapsed form, as shown in FIGS. 7 to 9, the disassembled kit can be stowed in a bag or box, etc.

The coiling diameter of the legs is chosen to match the external diameter of the collapsed head unit and foot assembly. Preferably the coils have a slightly smaller internal diameter so as to "hug" the external periphery, so as to slightly compress the leg housings and so help keep parts from rattling around, as well as minimising the size of the stowed tripod.

Such members 1 are typically manufactured on tubular formers or (in a continuous manufacturing process) in tubular dies in the extended tubular form to achieve an extended member of the desired cross section. The diameter of the member in its coiled form can be controlled by carefully selected orientation and positioning of the layers of fibre.

In most applications, it is anticipated that the member 1 will have a much larger coiling diameter than its extended tubular diameter, for instance between 2 and 4 times larger. In the present example, the member has a width of 105 mm in profile in its coiled form and an outer coil diameter of 152 mm. The member when extended has a 38 mm outer diameter and a length of 700 mm. This creates some additional challenges in engineering the member 1.

The larger coiling diameter may be achieved by increasing the longitudinal bending stiffness of the member 1 or changing the angles of the fibres relative to the longitudinal axis. For instance, additional longitudinal plies may be included to increase the bending stiffness, and/or the angled plies may be orientated to be angled less close to the longitudinal axis to achieve a greater coil diameter without sacrificing bistability. For instance, the angled fibres are angled (or have an average angle if not straight) at between 20 and 40 degrees to the longitudinal axis to increase the Poisson's ratio of these layers in the longitudinal direction so these layers achieve a large coil diameter, in contrast with typical members where the angles used are typically about 45 degrees. Thus, an example layup may be +−30, 90, 0, +−30.

It will be appreciated that the size of the tripod can be made to vary according to the application. Generally, tubes of thicknesses of between 30 and 60 mm are suitable for most applications, with coiled diameters of between 100 and 250 mm.

The tripod 10 is assembled by following these steps in reverse. Thus, the coiled legs are uncoiled from around the periphery of the central unit. The feet are detached from the sockets. The ends of the legs are inserted into the housing sockets and the feet sockets. The angle of the legs is then set and the levers used to clamp them to the desired position to attain the desired vertical height. The equipment to be supported is then attached to the top of the central unit, using any suitable fixture.

It will be appreciated that many of the advantages discussed above may be achieved with stands having different numbers of legs, i.e. not limited to being a tripod. Thus, monopods having a single clampable leg housing, leg and foot, may be provided, or stands having two legs, or four or more legs, etc.

The advantages of the sockets having a latch for engaging with an extendible member and/or socket that can be clamped at various angles, may have applicability in any application where it is desired to attach a body to an extendible member, e.g. where used as a mast, or handle, etc.

Embodiments of the present invention have been described with particular reference to the example illustrated. However, it will be appreciated that variations and modifications may be made to the examples described within the scope of the present invention.

The invention claimed is:

1. A kit for forming a stand for supporting an object, comprising:
   a head unit comprising a fixture for attaching to the object, and plural leg sockets circumferentially spaced around the head unit and pivotably attached to the head unit; and
   plural legs,
   wherein each leg comprises a bistable reelable composite member having a first stable form in the form of an elongate slit tube in which form the member is resiliently biased and acts as a leg, and wherein the tube can be opened out at the slit at an end and progressively coiled to reversibly attain a second stable form in the form of a coil,
   wherein the legs are configured to be co-coiled into a combined coil, the combined coil defining an internal space that is configured to accommodate at least part of the head unit; the leg sockets are pivoted inwards so that the head unit has a reduced outer diameter to configure the head unit to fit inside the internal space so the stand assumes a portable, collapsed configuration,
   wherein the legs are configured to be removed from around the head unit and extended; proximal ends of the legs are reversibly receivable in respective leg sockets and the leg sockets are pivotable outwards to position the legs such that the stand assumes a deployed configuration.

2. The collapsible stand according to claim 1, wherein an inner diameter of the combined coil is approximately equal to an outer diameter of the head unit, such that in the collapsed configuration the legs are coiled around the head unit to achieve a compact size.

3. The collapsible stand according to claim 1, wherein the head unit comprising a body and one or more leg housings in which the respective leg sockets are formed, wherein each leg housing is pivotally attached to the body to allow an angle of the leg to be adjusted, wherein the head unit further comprises a fixing mechanism for each leg, the fixing mechanism being movable by a user from a first position to at least a second position, wherein in the second position the fixing mechanism provides engagement between the leg housing and the head unit to fix the respective leg housing at a desired angle.

4. The collapsible stand according to claim 3, wherein a hinge joint is provided to pivotally attach each leg housing to the body, and the fixing mechanism comprises a lever with a camming action attached to a skewer pinning the hinge joint which is reversibly movable to compress the hinge joint and so clamp the leg housing in position.

5. The collapsible stand according to claim 1, wherein each leg has a through hole at its proximal end, and the leg housing has a movable latch comprising a protrusion configured to engage with the corresponding hole to retain the leg in place in the leg socket.

6. The collapsible stand according to claim 1, comprising plural foot units for attaching to distal ends of the respective legs, each foot unit having a foot socket for receiving a distal end of the respective leg, wherein each leg has a through hole at the distal end and the foot unit has a movable latch comprising a protrusion configured to engage with the corresponding hole to retain the leg in place in the foot socket.

7. The collapsible stand according to claim 5, wherein the protrusion is user operable to move between an engaging position in which it engages with the through hole of the leg and a releasing position in which it disengages to allow the leg to be removed.

8. The collapsible stand according to claim 7, wherein the protrusion is resiliently biased in the engaging position.

9. The collapsible stand according to claim 8, wherein the protrusion has a ramped camming surface facing the socket opening, such that a leading edge of the leg entering the socket bears on the ramped camming surface and moves the protrusion out of the way whilst the leg is fully inserted into the socket.

10. The collapsible stand according to claim 1, further comprising a removable central pillar downwardly extending from the head unit and arranged to contact the ground to provide vertical support to the stand when the legs are set at an obtuse angle when the stand is to be used in a lowermost position.

11. A method of using a kit according to claim 1, comprising one or more of:
   a) erecting the stand by uncoiling the one or more legs from around the head unit to assume their extended form, and fitting the one or more uncoiled legs to the leg sockets and optionally fitting respective foot units to the one or more uncoiled legs; and
   b) collapsing the stand by detaching the one or more legs from the head unit and if present detaching the respective foot units from the legs and coiling the legs around the head unit.

12. The method of claim 11, comprising, as part of step a) setting the one or more legs to a desired angle and clamping them into position and as part of step b) adjusting an angular position of the legs to a vertical position before coiling the legs around the head unit.

13. A collapsible stand for supporting an object, comprising:
   a head unit comprising a fixture for attaching to the object, and one or more plural leg sockets;
   plural legs proximal ends of which are reversibly received in the respective leg sockets to deploy the stand; and
   plural foot units for attaching to distal ends of the respective legs, each foot unit having a foot socket for receiving a distal end of the respective leg,
   wherein each leg comprises a bistable reelable composite member having a first stable form in the form of an elongate slit tube in which form the member is resiliently biased and acts as a leg, and wherein when removed from the socket, the tube can be opened out at the slit at an end and progressively coiled to reversibly attain a second stable form in the form of a coil, wherein to collapse the stand, the legs are configured to be removed from the leg sockets and foot sockets and co-coiled, the head unit and foot units are configured to be assembled by attaching the foot units directly to the respective leg sockets of the head unit, and the assembly is configured to at least partially be accommodated inside an internal space defined by the co-coiled legs.

14. The collapsible stand according to claim 13, wherein each leg has a through hole at the distal end and the foot unit has a movable latch resiliently biased such that a protruding part of the movable latch engages with the corresponding hole to retain the leg in place in the foot socket.

15. The collapsible stand according to claim 13, wherein the legs have a coiling diameter that is at least twice that of a diameter of the legs in extended tubular form to aid forming the coil around the head unit.

16. The collapsible stand according to claim 13, wherein the foot units are attached to the head unit sockets by one or more of:
a friction fit, a screw connection and a bayonetted fit.

17. The collapsible stand according to claim 1, wherein the legs have a coiling diameter that is at least twice that of a diameter of the legs in extended tubular form to aid forming the coil around the head unit.

18. The collapsible stand according to claim 14, wherein the foot unit comprises a tubular member extending from the foot socket forming an annular space with an inner surface of the socket for receiving the end of the leg, the tubular member comprising a through hole, such that, with the legs removed, the foot unit can be reversibly connected to the head unit by inserting the tubular member into a leg socket and the through hole of the tubular member engages with the protrusion of the movable latch of that leg socket to retain the foot unit in place.

* * * * *